United States Patent Office
2,901,345
Patented Aug. 25, 1959

2,901,345

PLUTONIUM-CERIUM-COBALT AND PLUTONIUM-CERIUM-NICKEL ALLOYS

Arthur S. Coffinberry, Los Alamos, N. Mex., assignor to the United States of America as represented by the United States Atomic Energy Commission No Drawing. Application July 17, 1958
Serial No. 749,304

3 Claims. (Cl. 75—122.7)

The present invention relates to alloys of plutonium and more particularly to low melting point plutonium alloys useful as neutronic reactor fuels.

In a neutronic reactor operational flexibility of the reactor system is dependent upon the flexibility of control of the fuel and cooling systems. The ease of handling liquid fuels adds to the ease of operation and control of the reactor, including reactor heat removal and reworking of the fuel. Liquid fuels have the further advantage that any portion of the spent or partially spent fuel may be replaced by an equivalent amount of new fuel while the reactor is in operation, thereby allowing reprocessing of spent fuel and continuous reactor operation. Another advantage is that the configuration of the bulk of liquid fuels can be rapidly changed from a critical shape to a non-critical shape, thereby permitting quick shut-down of the reactor. This may be accomplished for example by flowing the liquid fuel into a sufficiently long thin tube or a sufficiently large flat pan so that a non-critical geometry is attained. Liquid fuel reactors also obviate fuel element dimensional instability difficulties usually encountered with solid fuel reactors.

Utilization of plutonium as a reactor fuel enables the enhancement of fission power capabilities when the reactor is refueled by an integral, or associated, breeding cycle. Because of the high values of the capture-to-fission ratio of the thermal and epithermal neutron energies for the plutonium isotopes a plutonium fueled reactor must be either a fast or a fast-intermediate neutron spectrum device in order to obtain an appreciable breeding gain. In such a power producing reactor it is desirable to attain a large specific power (>500 watts/gram of fuel). Specific power is essentially a measure of the fuel inventory for a fixed output machine and is strongly dependent upon the design of the reactor heat-exchange mechanism. High specific power may be attained by either a high fuel dilution or an extremely efficient heat-transfer mechanism.

Plutonium metal melts at 640° C., a temperature that is somewhat high. In the field of liquid metal fuel neutronic reactors there has been a need for an alloy of plutonium having a melting point low enough to provide a plutonium liquid fuel, i.e., an alloy having a melting point about 200° C. lower than plutonium. The eutectics of three binary plutonium alloys having suitable neutronic characteristics are disclosed in U.S. Patent No. 2,890,954, issued to William Chynoweth on June 16, 1959, entitled "Plutonium Alloys." These eutectics are plutonium-cobalt, plutonium-nickel and plutonium-iron, and their mixture percentages and melting temperatures are as follows:

| Atomic Percent Alloy Metal | Percent Pu | Melting Temp., °C. |
|---|---|---|
| 12.0 cobalt | 88.0 | 405 |
| 14.0 nickel | 86.0 | 465 |
| 9.5 iron | 90.5 | 410 |

While having lower melting points and providing neutronic characteristics suitable for liquid fuel these eutectics have relatively high plutonium contents, i.e., they do not dilute the fuel volumetrically to a great extent. As indicated above, a high fuel dilution is desirable to attain a high specific power. In addition, high dilution of fuel results in lower power density (watts/cc. of fuel including diluent) and easier heat removal, thereby facilitating smaller temperature gradients with the concomitants of less corrosion, less thermal shock and stress, less fission product damage and possible higher fuel conductivity.

It is therefore an object of the present invention to provide low melting point plutonium alloys.

Another object of the present invention is to provide low melting point diluted plutonium alloy reactor fuels.

Yet another object of the present invention is to provide low melting point diluted plutonium alloy reactor fuels compatible with the fuel container.

Further objects of the present invention will be apparent from the following specifications and claims.

As shown above, the plutonium-cobalt system has a eutectic at 12.0 atomic percent cobalt and 405° C. I have discovered the existence in the plutonium-cerium-cobalt ternary system of a eutectic valley extending from the aforementioned plutonium-cobalt binary eutectic to a eutectic found to exist in the cerium-cobalt binary system at approximately 18 atomic percent cobalt and about 425° C. (from 88 a/o plutonium, 0 a/o cerium, 12 a/o cobalt at 405° C. to 0 a/o plutonium, 82 a/o cerium, 18 a/o cobalt at 425° C.). Nowhere along this valley can the eutectic temperature be greater than the higher of the two terminal binary eutectics, namely, 425° C. The exact course of this valley is unknown; however, for given proportions of plutonium and cerium within the above defined limits the proportion of cobalt necessary to form the alloy situated at the bottom of the eutectic valley is easily determined by thermal analysis methods well known in the art. Furthermore, my experimental results indicate that a plutonium alloy containing anywhere from 10 to 20 atomic percent cobalt with the remainder consisting of plutonium and cerium in any desired proportion, and with the plutonium not in excess of 88 atomic percent, will be situated sufficiently close to the bottom of the eutectic valley so that the alloy will begin to melt at about 425° C. and should be completely molten at a temperature not in excess of 500° C. The use of cerium as a diluent meets the stringent requirements for reactor fuels with cerium being one of the few metals having the desired neutronic compatibility, radiation stability and ease of alloying with plutonium. Hence, a liquid plutonium alloy fuel containing any desired amount of plutonium up to 88 atomic percent, and therefore practically any desired degree of dilution with a melting temperature no higher than 425° C., can be prepared from the plutonium-cerium-cobalt system in accordance with the teachings of the present invention.

I have also discovered the existence in the plutonium-cerium-nickel ternary system of a eutectic valley extending from the aforementioned plutonium-nickel binary eutectic at 14.0 atomic percent nickel and 465° C. to a eutectic found to exist in the cerium-nickel binary system at approximately 19 atomic percent nickel and 475° C. (from 86 a/o plutonium, 0 a/o cerium, 14 a/o nickel at 465° C. to 0 a/o plutonium, 81 a/o cerium, 19 a/o nickel at 475° C.). The exact course of this valley is unknown; however, for given proportions of plutonium and cerium within the above defined limits, the proportion of nickel necessary to form the alloy situated at the bottom of the eutectic valley is easily determined by thermal analysis methods well known to the art. In addition, my experimental results indicate that a plutonium alloy containing anywhere from 10 to 25 atomic percent nickel or a mixture of nickel and cobalt with the remainder consisting of plutonium and cerium in any desired proportion, and with the plutonium not in excess of 86 atomic percent, will be situated sufficiently close to the bottom of the eutectic valley so that the alloy will begin to melt at about 475° C. and should be completely molten at a temperature not in excess of 550° C.

Similar experiments using the plutonium-cerium-iron ternary system showed a similar eutectic valley, but melting temperatures along this valley are found to rise very rapidly with increasing cerium content toward the cerium-iron binary eutectic temperature of 640° C. Hence, the use of iron as a diluent would not provide the desired low melting point for all proportions of plutonium and cerium within the desired range of dilution.

It is known that both lanthanum and praseodymium form binary eutectics with nickel, so it is reasonable to postulate the existence of a eutectic valley in the plutonium-lanthanum-nickel and the plutonium-praseodymium-nickel ternary systems, and also for any of the other rare earth metals of the lanthanide series when combined with plutonium and nickel or plutonium and cobalt. Hence, other low melting point plutonium alloys similar to the alloys of the present invention suitable for neutronic reactor fuels may be developed by the substitution of other lanthanide series elements, including mixtures thereof, for cerium as the diluent.

When the alloys of the present invention are utilized as liquid fuel in a neutronic reactor an auxiliary heating apparatus may be provided for premelting the alloys. Once in use in a critical reactor region the alloy will be kept in liquid form by the heat of the nuclear reaction.

The plutonium used in the alloys of the present invention is at least 98 to 99% pure and does not contain significant amounts of neutron-absorbing elements. Although a plutonium of lesser purity could be used if the impurities were not neutron-absorbing elements, the purities specified are easily achieved and generally expected in the reactor art. The alloying metals must be of a correspondingly high neutronic and chemical purity.

To prepare any of the alloys of the present invention a magnesium oxide or other suitable crucible is arranged in a conventional vacuum furnace heated by resistance elements or by an inductive coil connected to an induction furnace circuit. The alloying metals in chunk or button form are usually placed in the crucible first since they are lighter than plutonium. Then chunks or buttons of plutonium are added. Since the plutonium is the heavier element, when melted it will tend to flow through the alloying elements and mix with them. At room temperature, the vacuum within the furnace should be $10^{-4}$ mm., or better, of Hg. When the metal is melted, out-gassing from the metal and crucible will degrade the vacuum to about $10^{-3}$ mm. to $5 \times 10^{-4}$ mm. of Hg. It has been found that mixing of the melted elements is faster if an induction type furnace is used. A frequency range of 10 kc. to 5 mc. is suggested and 500 kc. is very satisfactory. In order to melt the elements it is only necessary to raise the temperature of the mixture to the melting point of plutonium. However, to conserve time, the mixture is raised to about 1000° C. to 1200° C. In the preferred embodiment, after the mix has been in the melted state for a few minutes, the furnace is shut down and the alloy cools in the crucible. The crucible is then broken and the alloy slug recovered. It is recognized that an alloy shape could be cast within the furnace, if so desired. When small samples are prepared a concentrator ring well known within the art is placed inside the induction coil to concentrate the alternating current in the alloy in the necessarily small crucible. Because of the personnel hazard from the high alpha activity of the plutonium, all operations are carried on in protective hoods or through remotely controlled apparatus, as is well known in the art.

When the low melting point alloys of this invention are used in a completely liquid fuel system it is necessary to contain the liquid fuel with materials which are resistant to the corrosive characteristics of the fuel. It has been found that the elements tantalum and tungsten are, in general, very satisfactory from a corrosion resistance point of view. It is recognized, however, that at the present state of metallurgical art tantalum is easier than tungsten to fabricate into container shapes. Tantalum, having excellent corrosion resistance even under very high temperature (1300° C.) tests, has been found to be the best container metal for plutonium-cobalt and plutonium-nickel systems. Tungsten has better corrosion resistance properties than tantalum, but as mentioned above is more difficult to fabricate. As a container material, alloys of tantalum and tungsten are also possible, and it is realized that such alloys could have excellent corrosion resistance as well as good fabrication qualities.

Thus, there have been described new low melting point plutonium alloys suitable for use as neutronic reactor fuels while permitting a wide range of dilution.

What is claimed is:

1. A ternary alloy for a neutronic reactor fuel consisting essentially of from 10 to 20 atomic percent cobalt, sufficient plutonium to achieve a condition of nuclear criticality and not in excess of 88 atomic percent, and the balance cerium.

2. A ternary alloy for a neutronic reactor fuel consisting essentially of from 10 to 25 atomic percent nickel, sufficient plutonium to achieve a condition of nuclear criticality and not in excess of 86 atomic percent, and the balance cerium.

3. A ternary alloy for a neutronic reactor fuel consisting essentially of from 10 to 25 atomic percent of at least one element selected from the group consisting of nickel and cobalt, sufficient plutonium to achieve a condition of nuclear criticality and not in excess of 88 atomic percent, and the balance cerium.

References Cited in the file of this patent

Fulling et al.: "Z. Metallkunde," 34 (1942), 253–254.
Nowotny: "Z. Metallkunde," 34 (1942), 247–253.